(12) United States Patent
Lin et al.

(10) Patent No.: US 11,513,406 B2
(45) Date of Patent: Nov. 29, 2022

(54) DISPLAY PANEL, DISPLAY DEVICE AND REPAIRING METHOD OF DISPLAY PANEL

(71) Applicant: HKC CORPORATION LIMITED, Guangdong (CN)

(72) Inventors: Hung-chun Lin, Guangdong (CN); Junfei Zhang, Guangdong (CN); Yubo Gu, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/181,257

(22) Filed: Feb. 22, 2021

(65) Prior Publication Data

US 2022/0082893 A1     Mar. 17, 2022

(30) Foreign Application Priority Data

Sep. 16, 2020   (CN) .......................... 202010977083.5

(51) Int. Cl.
*G02F 1/1362* (2006.01)
(52) U.S. Cl.
CPC .. *G02F 1/136263* (2021.01); *G02F 1/136222* (2021.01); *G02F 1/136286* (2013.01)
(58) Field of Classification Search
CPC ......... G02F 1/136263; G02F 1/136222; G02F 1/136286

USPC ......................................................... 349/106
See application file for complete search history.

(56) References Cited

U.S. PATENT DOCUMENTS

| | | | | |
|---|---|---|---|---|
| 2010/0214503 A1* | 8/2010 | Lee | ................... | G02F 1/136259 349/54 |
| 2013/0265532 A1* | 10/2013 | Kim | ................... | G02F 1/133788 427/508 |
| 2021/0389635 A1* | 12/2021 | Wang | ................... | G02F 1/1368 |

\* cited by examiner

*Primary Examiner* — Nathanael R Briggs
*Assistant Examiner* — William D Peterson
(74) *Attorney, Agent, or Firm* — Westbridge IP LLC (57) ABSTRACT

The present application provides a display panel, a display device and a repairing method of the display panel, the display panel includes: a color filter substrate; an array substrate opposite to the color filter substrate and provided with a plurality of pixel areas at intervals, and each of the pixel areas including a signal line and a light-emitting diode electrically connected with the signal line; a liquid crystal layer located between the array substrate and the color filter substrate; a common electrode located on a surface of the color filter substrate facing the liquid crystal layer; and a plurality of compensation electrodes arranged at intervals and located on a surface of the array substrate facing the liquid crystal layer, the common electrode is opposite to the compensation electrodes, and the plurality of compensation electrodes corresponding to the plurality of light-emitting diodes one by one.

16 Claims, 6 Drawing Sheets

DISPLAY PANEL, DISPLAY DEVICE AND REPAIRING METHOD OF DISPLAY PANEL

CROSS REFERENCE TO RELATED APPLICATIONS

The present application claims priority to a Chinese patent application No. 202010977083.5, filed on Sep. 16, 2020 with the China National Intellectual Property Administration, entitled "display panel, display device and repairing method of display panel", the entirety content of which is incorporated herein by reference.

TECHNICAL FIELD

The present application relates to a technology field of display devices, particularly relates to a display panel, a display device and a repairing method of display panel.

BACKGROUND

With a rapid development of the display panel industry, the manufacturing process technology of the display panel has become more mature. Display panels using light-emitting diodes (LEDs) are also becoming more and more popular. However, during the manufacturing process, the light-emitting diodes may often be damaged due to certain factors, thereby increasing the possibility of repairing the display panels. In order to avoid this problem, the related art adopts a method of installing a plurality of light-emitting diodes in the pixels of a display panel. Although this method can reduce the possibility of repairing the display panel, it leads to an increase of the cost of the light-emitting diodes and a reduction of the available space in the pixels of the display panel.

The above content is only used to assist the understanding of the technical solution of the present application, and does not mean that the above content is recognized as prior art.

SUMMARY

A main purpose of the present application is to provide a display panel, aiming at reducing a number of the light-emitting diodes and production cost.

In order to realize the above-mentioned purpose, the present application provides a display panel, including:

a color filter substrate;

an array substrate opposite to the color filter substrate and provided with a plurality of pixel areas at intervals, each of the plurality of pixel areas comprising a signal line and a light-emitting diode electrically connected with the signal line;

a liquid crystal layer located between the array substrate and the color filter substrate;

a common electrode located on a surface of the color filter substrate facing the liquid crystal layer; and a plurality of compensation electrodes arranged at intervals and located on a surface of the array substrate facing the liquid crystal layer, the common electrode being opposite to the plurality of compensation electrodes, and the plurality of compensation electrodes corresponding to the plurality of one light-emitting diodes one by one.

In one embodiment of the present application, the compensation electrodes are located above the signal lines.

In one embodiment of the present application, the common electrode is a transparent electrode, and the compensation electrode is a conductive electrode.

In one embodiment of the present application, further including a repairing line for connecting a compensation electrode corresponding to an abnormal light-emitting diode with a corresponding signal line when at least one of the abnormal light-emitting diodes is detected.

In one embodiment of the present application, a voltage applied to a compensation electrode corresponding to the abnormal light-emitting diode is U1, and a voltage applied to a compensation electrode adjacent to the abnormal light-emitting diode is U2, wherein U2>U1.

The present application also provides a repairing method of a display panel, applied on the display panel, including:

providing a color filter substrate and an array substrate are opposite to the color filter substrate, the array substrate being provided with a plurality of pixel areas at intervals, and each of the plurality of pixel areas being provided with a signal line and a light-emitting diode electrically connected with the signal line;

providing a liquid crystal layer to be located between the array substrate and the color filter substrate;

providing a common electrode to be located on a surface of the color filter substrate facing the liquid crystal layer;

providing a plurality of compensation electrodes to be arranged at intervals and located on a surface of the array substrate facing the liquid crystal layer, the common electrode being opposite to the plurality of compensation electrodes, and one compensation electrode corresponding to one light-emitting diode;

performing a detection process to determine whether at least one light-emitting diode is abnormal; and performing a repairing process to connect the compensation electrodes that corresponds to an abnormal light-emitting diode with a corresponding signal line when at least one of abnormal light-emitting diodes is detected.

In one embodiment of the present application, before performing a detection process, further includes: putting the compensation electrodes above the signal lines.

In one embodiment of the present application, when a repairing process is performed, a step taken is: applying a voltage U1 to a compensation electrode corresponding to the abnormal light-emitting diode, and applying a voltage U2 to a compensation electrode adjacent to the abnormal light-emitting diode, wherein U2>U1.

In one embodiment of the present application, before performing a repairing process, further includes: providing a repairing line for connecting a compensation electrode corresponding to an abnormal light-emitting diode with the corresponding signal line when at least one of the abnormal light-emitting diodes is detected.

The present application also provides a display device, includes the above-mentioned display panel.

The display panel of the present application includes a color filter substrate, an array substrate, a liquid crystal, a common electrode and a plurality of compensation electrode, an array substrate is opposite to the color filter substrate and provided with a plurality of pixel areas at intervals, and each of the plurality of pixel areas comprises a signal line and a light-emitting diode electrically connected with the signal line; a liquid crystal layer is located between the array substrate and the color filter substrate; a common electrode is located on a surface of the color filter substrate facing the liquid crystal layer; a plurality of compensation electrodes are arranged at intervals and located on a surface of the array substrate facing the liquid crystal layer, the common electrode is opposite to the plurality of compensation electrodes, and one compensation electrode corresponding to one light-emitting diode. In such way, when a light-emitting diode is abnormal, a deflection direction of liquid crystal molecules in the liquid crystal layer is adjusted through a corresponding compensation electrode, thereby controlling a direction of the light, so as to solve the technical problem of dishomogeneous brightness of the display panel caused by the abnormal light-emitting diodes. The present application adjusts the deflection direction of the liquid crystal molecules in the liquid crystal layer through the compensation electrodes, thereby controlling a direction of the light. For there is no need to set a spare light-emitting diode in a pixel area to solve the technical problem of the dishomogeneous brightness of the display panel caused by abnormal light-emitting diodes, the number of light-emitting diodes and saving production costs are reduced.

BRIEF DESCRIPTION OF THE DRAWINGS

For more clearly illustrate the technical solutions in the embodiments of the present application or the related art, the drawing figures required in the description of the embodiments or the related art will be simply introduced as below. Obviously, the drawings described as below are merely some embodiments of the present application. For one of ordinary skill in the art, other drawings also can be obtained based on structures illustrated by those drawings without creative work.

The realization of the purposes, functional characteristics, and advantages of the present application will be further described in conjunction with the embodiments and with reference to the accompanying drawings.

DETAILED DESCRIPTION OF THE EMBODIMENTS

The technical solutions in the embodiments of the present application will be clearly and completely described in conjunction with the drawings in the embodiments of the present application as below. Obviously, the described embodiments are only a portion of the embodiments of the present application, rather than all the embodiments. Based on the embodiments in the present application, all other embodiments obtained by one of ordinary skill in the art without any creative work shall fall within the protection scope of the present application.

It should be noted that all directional indications (such as up, down, left, right, front, back . . . ) in the embodiments of the present application are only set to explain the relative position relationship, movement situation, etc. between components in a specific posture (as shown in the accompanying drawings). If the specific posture changes, the directional indication will change accordingly.

In the present application, unless otherwise specifically stipulated and defined, the terms "connect", "fix", etc. should be interpreted broadly, such as, "fix" can be a fixed connection, a detachable connection, or be integrated as a whole, a mechanical connection or an electrical connection, directly connected or indirectly connected through an intermediate medium, and an internal communication between two components or an interaction relationship between two components. Unless otherwise specifically defined, for one of ordinary skill in the art, the specific meaning of the above terms in the present application can be understood according to the specific situation.

In addition, the description of "first", "second", etc. involved in the present application are only set for descriptive purposes, and cannot be understood as indicating or implying their relative importance or implicitly indicating a number of indicated technical features. Therefore, the features defined with "first", "second" may explicitly or implicitly include at least one of the features. In addition, the technical solutions between the various embodiments can be combined with each other, but must be based on what can be achieved by one of ordinary skill in the art. When a combination of technical solutions is contradictory or cannot be achieved, it should be considered that such a combination of technical solutions does not exist, and is not within the protection scope required by the present application.

The present application provides a display panel 100.

Figure 1:
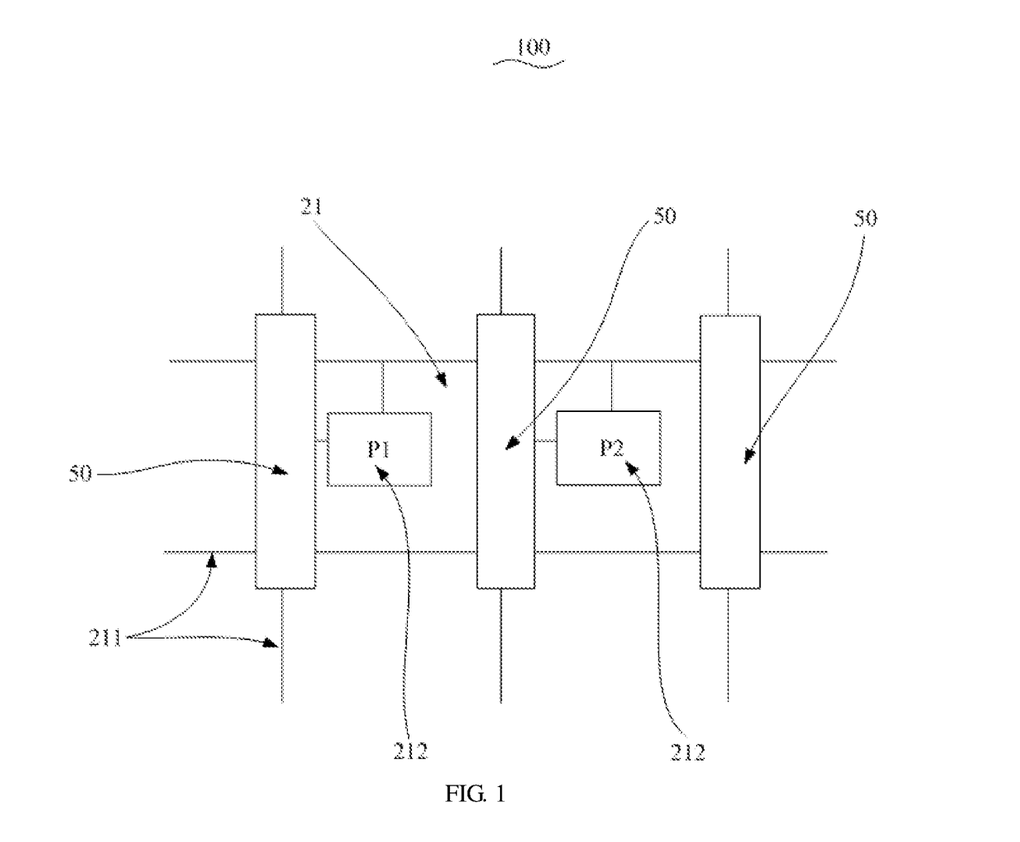
FIG. 1 is a schematic structural diagram of a display panel with a normal display according to the present application.
Figure 3:
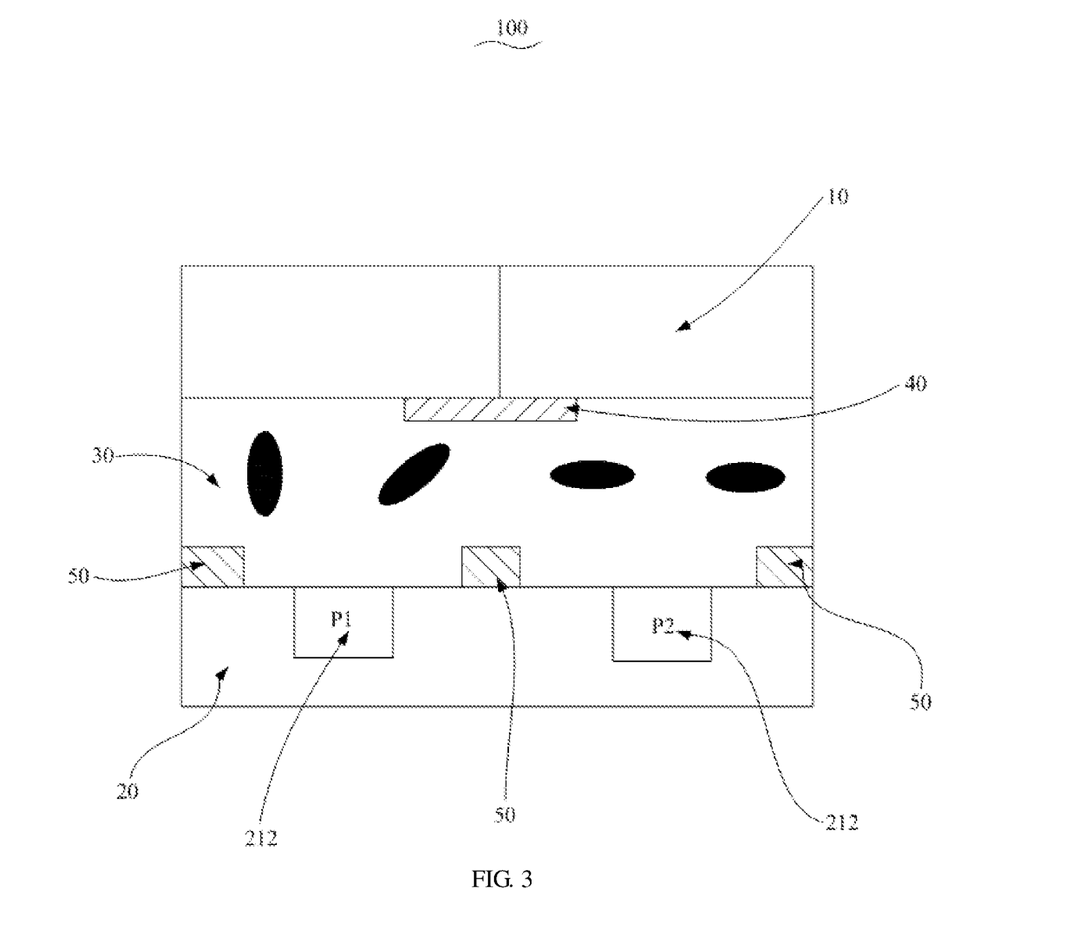
FIG. 3 is a schematic cross-sectional structural diagram of a liquid crystal layer of FIG. 2 according to the present application, the liquid crystal layer being deflected.

Referring to FIGS. 1 and 3, in the embodiments of the present application, the display panel 100 includes:

a color filter substrate 10;

an array substrate 20 opposite to the color filter substrate 10 and provided with a plurality of pixel areas 21 at intervals, each of the plurality of pixel areas 21 including a signal line 211 and a light-emitting diode 212 electrically connected with the signal line 211;

a liquid crystal layer 30 located between the array substrate 20 and the color filter substrate 10;

a common electrode 40 located on a surface of the color filter substrate 10 facing the liquid crystal layer 30; and a plurality of compensation electrodes 50 arranged at intervals and located on a surface of the array substrate 20 facing the liquid crystal layer 30, the common electrode 40 being opposite to the plurality of compensation electrodes 50, and the plurality of compensation electrodes 212 corresponding to the plurality of light-emitting diodes 50 one by one.

Specifically, the array substrate 20 is a transparent substrate, such as a glass substrate, a quartz substrate, etc. The array substrate 20 includes a plurality of pixel areas 21 arranged in an array. Signal lines 211 are insulated from each other and intersect to define the plurality of pixel areas 21. The signal lines 211 include horizontal signal lines and vertical signal lines perpendicular to the horizontal signal lines, and two adjacent horizontal signal lines 211 and two adjacent vertical signal lines 211 enclose a pixel area 21.

The signal lines 211 are made of conductive material, such as aluminum alloy, chromium, etc. The light emitting diode 212 is provided in one of the pixel areas 21 and is electrically connected with one of the horizontal signal lines and one of the vertical signal lines. The common electrode 40 is located on the surface of the color filter substrate 10 facing the liquid crystal layer 30. The common electrode 40 is opposite to the plurality of compensation electrodes 50. One compensation electrode 50 corresponds to one light emitting diode 212. When the display panel 100 displays normally, there is no need to apply a voltage across the common electrode 40 and the compensation electrodes 50, liquid crystal molecules in the liquid crystal layer 30 do not deflect and produce no prism effect. When a common voltage is applied across the common electrode 40 and the compensation electrodes 50, and a high voltage is applied to an adjacent compensation electrode 50, the liquid crystals without being applied with a high voltage are deflected and have a lower refractive index, and the liquid crystal molecules applied with the high voltage have a higher refractive index, the optical effect produced can be equivalent to a thin prism. When passing through the thin prism, the light will deflect to one side to achieve the light deflection. It should be noted that only half of the light (that is, extraordinary light) will deflect (that is, changes its direction), and the other half of the light (ordinary light) will not change its direction.

The display panel 100 of the present application includes: a color filter substrate 10, an array substrate 20, a liquid crystal layer 30, a common electrode 40 and a plurality of compensation electrode 50. The array substrate 20 is opposite to the color filter substrate 10. The array substrate 20 is provided with a plurality of pixel areas 21 at internals. Each of the plurality of pixel areas 21 is provided with a signal line 211 and a light-emitting diode 212 electrically connected with the signal line 211. The liquid crystal layer 30 is located between the array substrate 20 and the color filter substrate 10. The common electrode 40 is located on a surface of the array substrate 20 facing the liquid crystal layer 30. The plurality of compensation electrodes 50 are arranged at internals and located on a surface of the color filter substrate 10 facing the liquid crystal layer 30. The common electrode 40 is opposite to the plurality of compensation electrodes 50. One compensation electrode 50 corresponds to one light-emitting diode 212. When a light-emitting diode 212 is abnormal, a deflection direction of liquid crystal molecules in the liquid crystal layer 30 is adjusted through a corresponding compensation electrode 50, thereby controlling a direction of the light, so as to solve the technical problem of dishomogeneous brightness of the display panel caused by the abnormal light-emitting diode 212. The present application adjusts the deflection direction of the liquid crystal molecules in the liquid crystal layer 30 through the compensation electrodes 50, thereby controlling a direction of the light. For there is no need to set a spare light-emitting diode 212 in a pixel area 21 to solve the technical problem of the dishomogeneous brightness of the display panel 100 caused by abnormal light-emitting diodes 212, the number of light-emitting diodes 212 and production costs are reduced.

Further, in order to avoid affecting a display effect of the display panel, the compensation electrodes 50 are located above the signal lines 211. Each of the compensation electrode 50 is strip-shaped and an extension direction of the compensation electrode 50 is same as an extension direction of the signal lines 211. For example, if the compensation electrodes 50 are arranged above the vertical signal lines, the extension direction of the compensation electrodes 50 are consistent with a vertical direction.

Further, the common electrode 40 is a transparent electrode, and the compensation electrodes 50 are conductive electrodes.

In this embodiment, the common electrode 40 is a transparent electrode made from at least one of an indium tin oxide (ITO), indium zinc oxide (IZO), zinc oxide (ZnO), indium oxide (In2O3), indium gallium oxide (IGO) and aluminum zinc oxide (AZO). The compensation electrodes 50 are conductive electrodes, for example they can be metal, metal oxide or organic conductive layers. The purpose of the present application is to control deflection directions of liquid crystal molecules through the common electrode 40 and the compensation electrodes 50. Generally, the common electrode 40 and the compensation electrodes 50 are connected with their corresponding substrates by floating connection.

Figure 2:
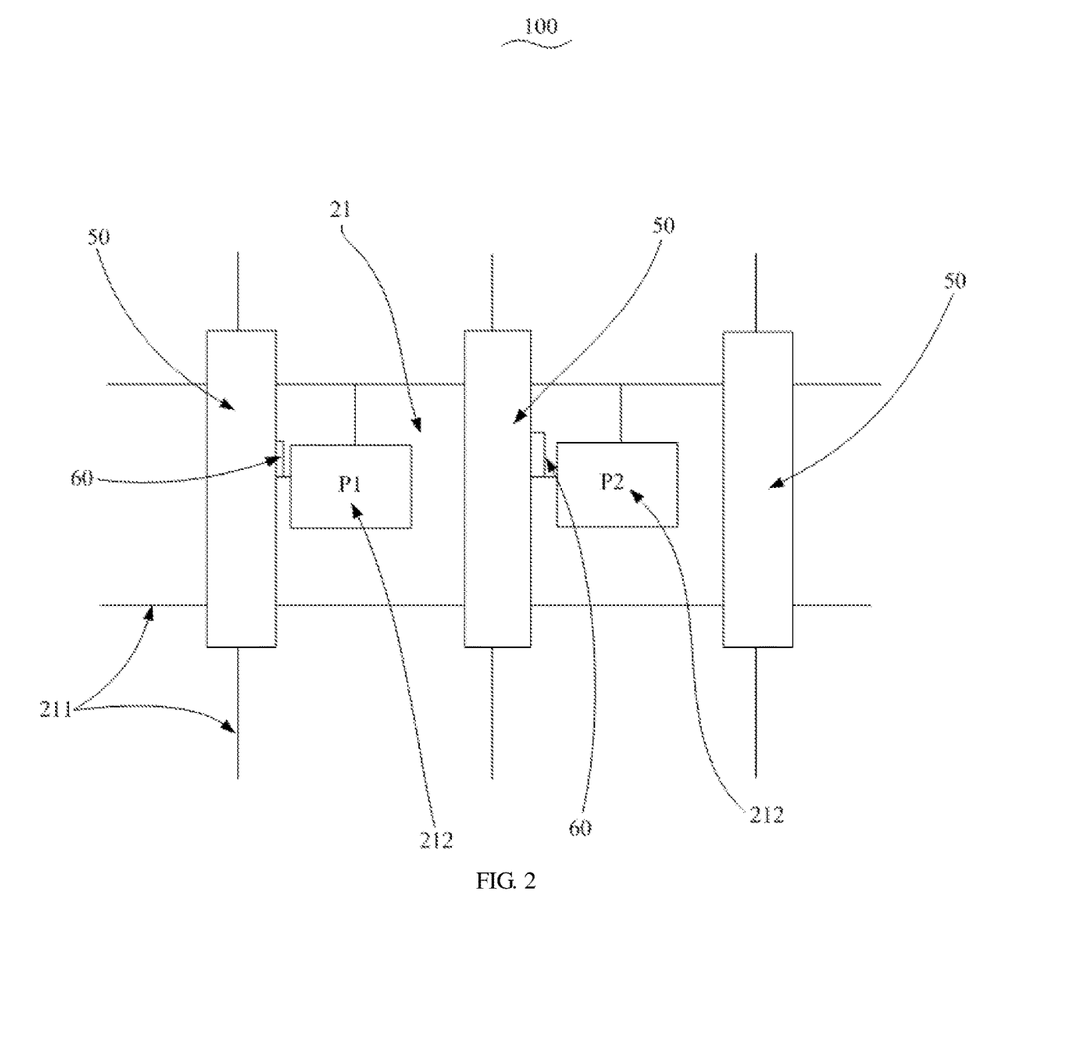
FIG. 2 is a schematic structural diagram of a display panel with an abnormal light-emitting diode according to the present application.

Please refer to FIG. 2, the display panel 100 further includes a repairing line 60. When at least one of the light-emitting diodes 212 is abnormal, the repairing line 60 is for connecting a compensation electrode 50 corresponding to the abnormal light-emitting diode 212 with a corresponding signal line 211.

In this embodiment, an abnormality of a light-emitting diode 212 may be that the light-emitting diode 212 is damaged or a circuit connected thereto is abnormal, resulting that the light-emitting diode 212 does not emit light. The repairing line 60 is a laser-repairing line. When at least one of the light-emitting diodes 212 is abnormal, the repairing line 60 electrically connects the compensation electrode 50 corresponding to the light-emitting diode 212 with the corresponding signal line 211. A voltage is applied across the compensation electrode 50 and the common electrode 40 to control a deflection direction of the liquid crystal molecules, thereby controlling the direction of light.

Further, due to light of a normal light-emitting diode 212 is more bright, in order to deflect light of a normal light-emitting diode 212 to an adjacent abnormal light-emitting diode 212 and make the liquid crystal molecules deflect, a voltage applied to a compensation electrode corresponding to the abnormal light-emitting diode is U1, and a voltage applied to a compensation electrode adjacent to the abnormal light-emitting diode is U2, where U2>U1.

The present application also provides a repairing method of display panel, applied on the display panel 100. The specific structure of the display panel 100 refers to the above-mentioned embodiments. Due to the repairing method of the display panel adopts all the technical solutions of the above-mentioned embodiments, it has at least all the beneficial effects brought by the technical solutions of the above-mentioned embodiments, which won't be repeated here.

Figure 4:
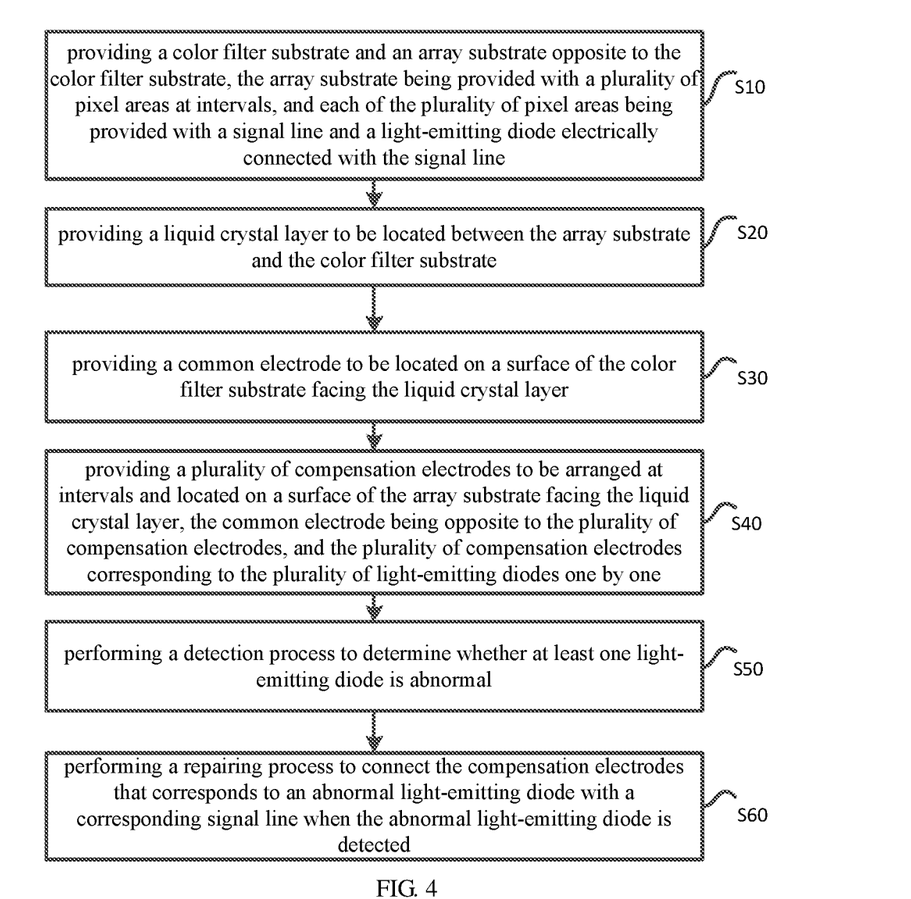
FIG. 4 is a flow diagram of a repairing method of a display panel according to the present application.

Please refer to FIG. 4, the repairing method of display panel adopts steps as below:

S10, providing a color filter substrate 10 and an array substrate 20 opposite to the color filter substrate 10, the array substrate 20 being provided with a plurality of pixel areas 21 at intervals, and each of the plurality of pixel areas 21 being provided with a signal line 211 and a light-emitting diode 212 electrically connected with the signal line 211;

S20, providing a liquid crystal layer 30 to be located between the array substrate 20 and the color filter substrate 10;

S30, providing a common electrode 40 to be located on a surface of the color filter substrate 10 facing the liquid crystal layer 30;

S40, providing a plurality of compensation electrodes 50 to be arranged at intervals and located on a surface of the array substrate 20 facing the liquid crystal layer 30, the common electrode 40 being opposite to the plurality of compensation electrodes 50, and the plurality of compensation electrodes 212 corresponding to the plurality of light-emitting diodes 50 one by one;

S50, performing a detection process to determine whether at least one light-emitting diode 212 is abnormal; and S60, performing a repairing process to connect the compensation electrodes that corresponds to an abnormal light-emitting diode with a corresponding signal line when the abnormal light-emitting diodes is detected.

In this embodiment, there are two light-emitting diodes 212, one is P1 and the other is P2. When the light-emitting diodes 212 are normal, the display panel 100 operates normally according to the structure shown in FIG. 1. The detection process may include at least one of an electrical detection process or an optical detection process. The optical detection process adopts a light source to generate an excitation light to induce the light-emitting diode 212 to emit fluorescence, and adopts a scan camera to detect a situation of the fluorescence emitted by the diode 212 at a specific wavelength, thereby determining whether the light-emitting diode 212 is damaged. The electrical detection process adopts a probe to give a signal required by the light-emitting diode 212 to the light-emitting diode 212, thereby determining whether the light-emitting diode 212 operates normally. For example, if the detection result shows that the light-emitting diodes 212 of all pixel areas 21 are normal, there is no need to perform the repairing process. If the detection result shows that the light-emitting diode 212 of a certain pixel area 21 is malfunction, it is determined that the light emitting diode 212 is abnormal.

When a certain light-emitting diode 212 such as light-emitting diode P2 is abnormal, a repairing process is performed. A compensation electrode 50 corresponding to the abnormal light-emitting diode P2 is connected with the corresponding signal line 211, so that a high voltage is applied to a compensation electrode 50 corresponding to the light-emitting diode P1, and a low voltage is applied to the compensation electrode 50 corresponding to the light-emitting diode P2, a uneven electric field is formed, resulting that some liquid crystal molecules deflect. As shown in FIG. 3, the light-emitting diode P1 is normal, at this time, the light emitted by the light-emitting diode P1 will be deflected correspondingly according to the deflection of the liquid crystal molecules, thereby a part of the light will be shared to the abnormal light-emitting diode P2, so that there is no obvious dark spot and the problem of the related art is avoided.

Figure 5:
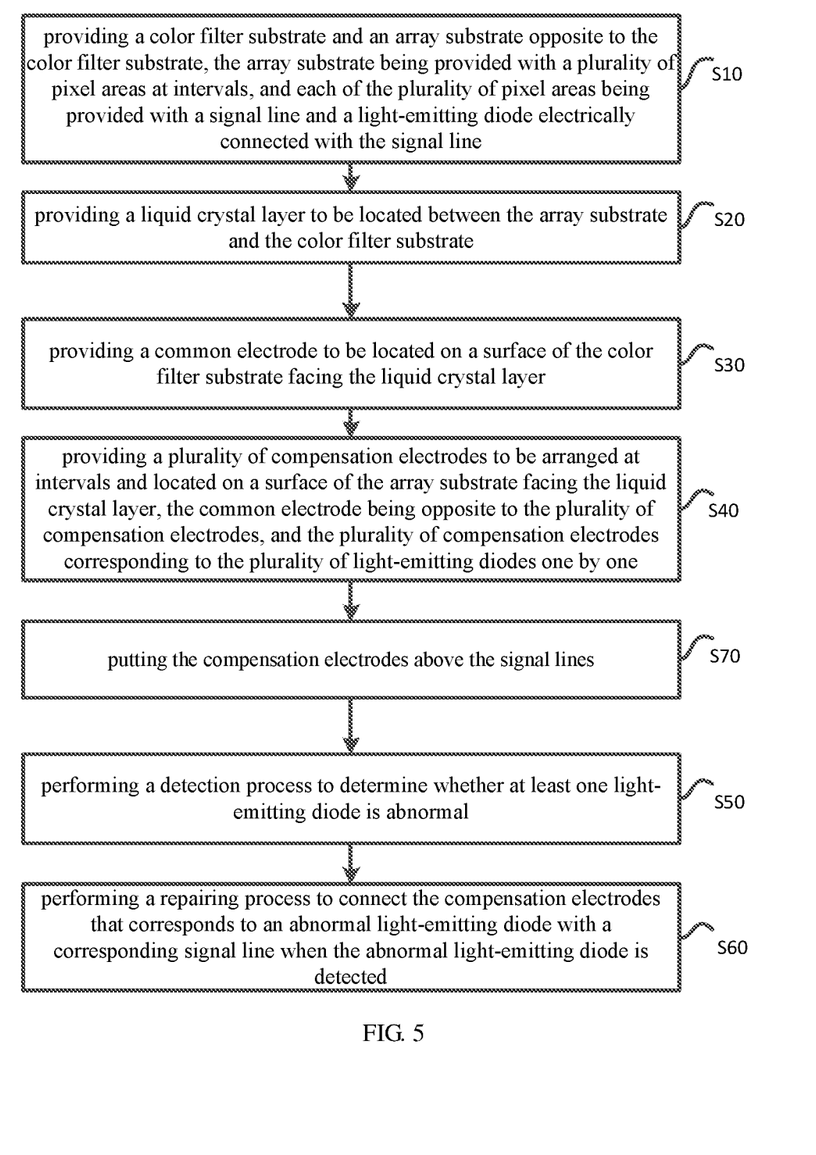
FIG. 5 is a flow diagram of another embodiment of the repairing method of a display panel according to the present application.

Please refer to FIG. 5, before performing the detection process, the method further includes the following steps:

S70, putting the compensation electrodes 50 above signal lines 211. The compensation electrodes 50 are put above the signal lines 211 through floating connection to avoid affecting the display effect.

Further, the repairing process further includes:

applying a voltage U1 to a compensation electrode 50 corresponding to the abnormal light-emitting diode 212, and applying a voltage U2 to a compensation electrode 50 adjacent to the abnormal light-emitting diode 212, where U2>U1.

Figure 6:
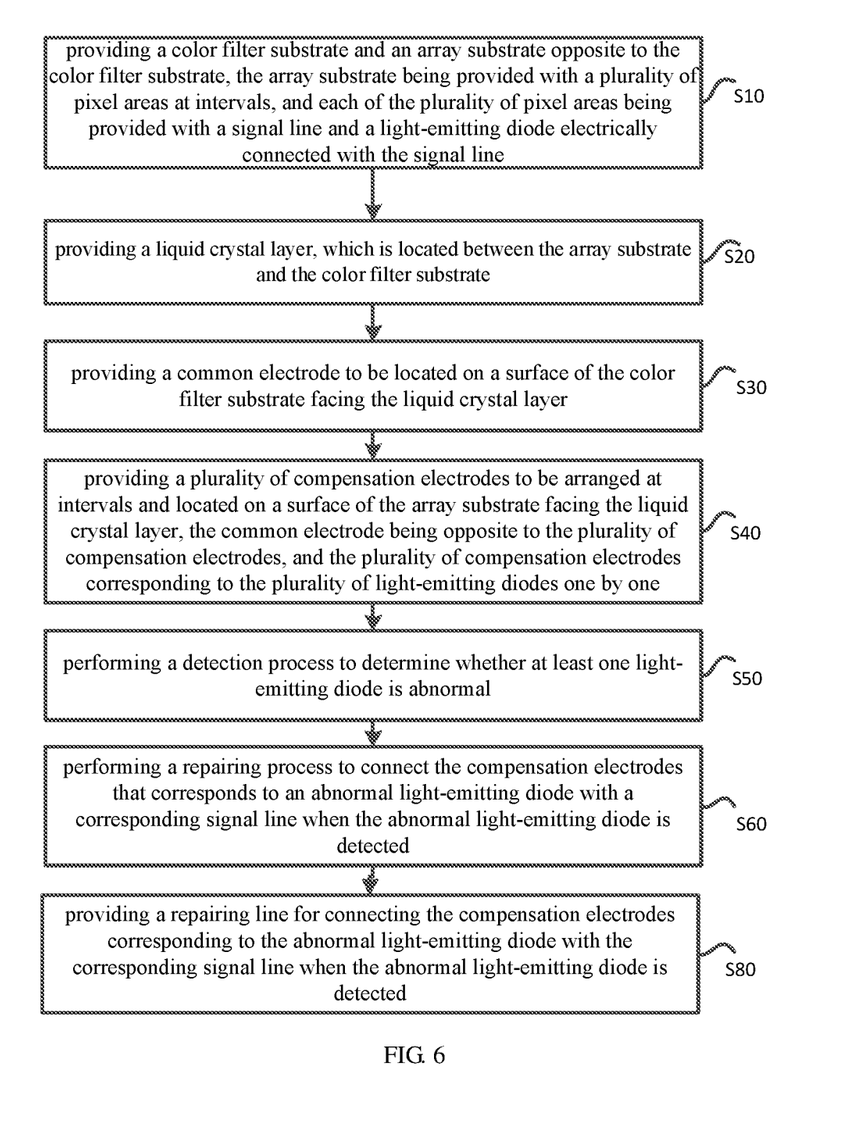
FIG. 6 is a flow diagram of a still another embodiment of the repairing method of a display panel according to the present application.

Please refer to FIG. 6, before performing the repairing process, the method further includes the following steps:

S80, providing a repairing line 60 for connecting a compensation electrode 50 corresponding to an abnormal light-emitting diode 212 with the corresponding signal line 211 when at least one of the light-emitting diodes 212 is abnormal.

In this embodiment, there are two light-emitting diodes 212, one is P1 and the other is P2. When the light-emitting diodes 212 are normal, the display panel 100 operates normally according to the structure shown in FIG. 1. When a certain light-emitting diode 212 such as P2 is normal, the repairing line 60 which is a laser-repairing line connects a compensation electrode 50 corresponding to the light-emitting diode P1 with the signal line 211, so that a high voltage is applied to the compensation electrode 50 corresponding to the light-emitting diode P1, and a low voltage is applied to the compensation electrode 50 corresponding to the light-emitting diode P2, thereby forming a high and low uneven electric field, resulting that some liquid crystal molecules deflect. As shown in FIG. 3, the light-emitting diode P1 is normal, at this time, the light emitted by the light-emitting diode P1 will be deflected correspondingly according to the deflection of the liquid crystal molecules, thereby a part of the light will be shared to the abnormal light-emitting diode P2, so that the dark spot is not obvious, thereby solving the problem of the prior art.

The present application also provides a display device, which includes a display panel 100. A specific structure of the display panel 100 refers to the above-mentioned embodiments. Due to the display device adopts all the technical solutions of all the above-mentioned embodiments, it has at least all the beneficial effects brought by the technical solutions of the above-mentioned embodiments, which won't be repeated here.

The display device can be products or elements with display functions, such as a liquid crystal panel, an electronic paper, an LED panel, a liquid crystal TV, a liquid crystal display, a digital photo frame, a mobile phone, a tablet computer, etc., especially the display device using liquid crystal prism.

The above descriptions are only optional embodiments of the present application, and do not limit the scope of the present application. Under the concept of the present application, the equivalent structure transformations made by using the description and drawings of the present application, or direct/indirect applications to other related technical fields are all included in the claimed scope of the present application.

What is claimed is:

1. A display panel, comprising:
   a color filter substrate;
   an array substrate opposite to the color filter substrate and comprising a plurality of pixel areas arranged in an array, each of the plurality of pixel areas comprising a plurality of signal lines, wherein the plurality of signal lines comprise two adjacent horizontal signal lines and two adjacent vertical signal lines perpendicular to the two adjacent horizontal signal lines, and each of the plurality of pixel areas is formed by two adjacent horizontal signal lines and two adjacent vertical signal lines;
   each of the plurality of pixel areas is provided with a light-emitting diode, and each of the plurality of light-emitting diodes being electrically connected to one of the two adjacent horizontal signal lines and one of the two adjacent vertical signal lines;
   a liquid crystal layer located between the array substrate and the color filter substrate;
   a common electrode located on a surface of the color filter substrate facing the liquid crystal layer; and
   a plurality of compensation electrodes arranged at intervals and located on a surface of the array substrate facing the liquid crystal layer, the common electrode being opposite to the plurality of compensation electrodes, and the plurality of compensation electrodes corresponding to the plurality of light-emitting diodes one by one, and when one of a plurality of light-emitting diodes is abnormal, a corresponding compensation electrode of the plurality of compensation electrodes being configured to adjust a deflection direction of liquid crystal molecules to control a direction of light.

2. The display panel according to claim 1, wherein each of the plurality of compensation electrodes is located above one of two adjacent horizontal signal lines or one of two adjacent vertical signal lines.

3. The display panel according to claim 1, wherein the common electrode is a transparent electrode, and the plurality of compensation electrode are conductive electrodes, wherein the common electrode and the plurality of compensation electrodes are connected with their corresponding substrates by floating connection.

4. The display panel according to claim 1, further comprising: a repairing line for connecting one of the plurality of compensation electrodes corresponding to an abnormal light-emitting diode with a corresponding signal line when the abnormal light-emitting diode is detected, wherein a voltage is applied across the compensation electrode corresponding to the abnormal light-emitting diode and a voltage is applied across a common electrode adjacent to the abnormal light-emitting diode, to control a deflection direction of the liquid crystal molecules.

5. The display panel according to claim 4, wherein the voltage applied to the compensation electrode corresponding to the abnormal light-emitting diode is U1, and the voltage applied to the compensation electrode adjacent to the abnormal light-emitting diode is U2, wherein U2>U1.

6. The display panel according to claim 4, wherein the repairing line is a laser-repairing line.

7. The display panel according to claim 1, wherein each of compensation electrodes is strip-shaped, and an extension direction of each of the compensation electrodes is same as an extension direction of each of the plurality of signal lines under the compensation electrode.

8. The display panel according to claim 3, wherein a material of the transparent electrode comprises at least one of an indium tin oxide (ITO), an indium zinc oxide (IZO), a zinc oxide (ZnO), an indium oxide (In2O3), an indium gallium oxide (IGO) and an aluminum zinc oxide (AZO).

9. A repairing method of a display panel, comprising:
providing a color filter substrate and an array substrate opposite to the color filter substrate and comprising a plurality of pixel areas arranged in an array, and each of the plurality of pixel areas comprising a plurality of signal lines, wherein the plurality of signal lines comprise two adjacent horizontal signal lines and two adjacent vertical signal lines perpendicular to the two adjacent horizontal signal lines, and each of the plurality of pixel areas is formed by two adjacent horizontal signal lines and two adjacent vertical signal lines;
each of the plurality of pixel areas is provided with a light-emitting diode, and each of the plurality of light-emitting diodes being electrically connected to one of the two adjacent horizontal signal lines and one of the two adjacent vertical signal lines;
providing a liquid crystal layer to be located between the array substrate and the color filter substrate;
providing a common electrode to be located on a surface of the color filter substrate facing the liquid crystal layer;
providing a plurality of compensation electrodes to be arranged at intervals and located on a surface of the array substrate facing the liquid crystal layer, the common electrode being opposite to the plurality of compensation electrodes, and the plurality of compensation electrodes corresponding to the plurality of light-emitting diodes one by one, and when one of a plurality of light-emitting diodes is abnormal, a corresponding compensation electrode of the plurality of compensation electrodes being configured to adjust a deflection direction of liquid crystal molecules to control a direction of light;
performing a detection process to determine whether at least one light-emitting diode is abnormal; and
performing a repairing process to connect the compensation electrodes that corresponds to an abnormal light-emitting diode with a corresponding signal line when the abnormal light-emitting diode is detected.

10. The repairing method according to claim 9, wherein before performing a detection process, the repairing method further comprises:
putting the plurality of compensation electrodes above one of two adjacent horizontal signal lines or one of two adjacent vertical signal lines.

11. The repairing method according to claim 9, wherein the repairing process comprises:
applying a voltage U1 to the compensation electrode corresponding to the abnormal light-emitting diode, and applying a voltage U2 to a compensation electrode adjacent to the abnormal light-emitting diode, wherein U2>U1.

12. The repairing method according to claim 9, wherein before performing the repairing process, the repairing method further comprises:
providing a repairing line for connecting one of the plurality of compensation electrodes corresponding to the abnormal light-emitting diode of the plurality of the light-emitting diodes with a corresponding signal line when the abnormal light-emitting diode is detected, wherein a voltage is applied across the compensation electrode corresponding to the abnormal light-emitting diode and a voltage is applied across a common electrode adjacent to the abnormal light-emitting diode, to control a deflection direction of the liquid crystal molecules.

13. The repairing method according to claim 12, wherein the repairing line is a laser-repairing line.

14. The repairing method according to claim 9, wherein each of compensation electrodes is strip-shaped, and an extension direction of each of the compensation electrodes is same as an extension direction of each of the plurality of signal lines under the compensation electrode.

15. The repairing method according to claim 9, wherein the common electrode is a transparent electrode, and the plurality of compensation electrode are conductive electrodes.

16. A display device, comprising the display panel according to claim 1.

* * * * *